United States Patent [19]
Johnson

[11] Patent Number: 5,475,277
[45] Date of Patent: Dec. 12, 1995

[54] DIFFERENTIAL TORQUE MOTOR

[75] Inventor: William H. Johnson, Colchester, Vt.

[73] Assignee: Fluidmaster, Inc., Anaheim, Calif.

[21] Appl. No.: 95,688

[22] Filed: Jul. 21, 1993

[51] Int. Cl.$^6$ .................................................. H02K 21/12
[52] U.S. Cl. ...................... 310/156; 310/68 R; 310/179; 310/254; 310/261
[58] Field of Search ..................... 310/156, 179, 310/180, 114, 181, 152, 254, 261, 68 R

[56] References Cited

U.S. PATENT DOCUMENTS

| | | | |
|---|---|---|---|
| 4,306,164 | 12/1981 | Itoh et al. | 310/156 |
| 4,447,793 | 5/1984 | Gray | 310/156 |
| 4,972,112 | 11/1990 | Kim | 310/156 |
| 5,030,864 | 7/1991 | Van Hout | 310/179 |
| 5,030,867 | 7/1991 | Yamada et al. | 310/156 |
| 5,250,867 | 10/1993 | Gizaw | 310/179 |
| 5,258,697 | 11/1993 | Ford et al. | 310/156 |
| 5,281,879 | 1/1994 | Stake et al. | 310/156 |
| 5,323,077 | 6/1994 | Brandes | 310/156 |

FOREIGN PATENT DOCUMENTS 2367374  10/1976  France.

Primary Examiner—R. Skudy
Attorney, Agent, or Firm—Freilich Hornbaker Rosen

[57] ABSTRACT

A PM (permanent magnet) motor is described, that uses electromagnetic current to release or pull a PM, which has increased starting torque and a large power output in a small volume. The motor includes phase units (60, FIG. 3) each having three electromagnets (46A–46C) and each having two PMs (44A, 44B) of Nd-B-Fe permanent magnet material. At a start position, a PM (44B) of each phase unit is centered between the cores (50B, 50C) of two electromagnets, and there is slight overlap (90, FIG. 6) of each of the two core faces (64B, 64C) with the PM face (62A). Each PM face has a longer circumferential length (D) than that (G) of each core face. Each PM face and each core face, has an axial length (E, FIG. 1) which is much larger than its circumferential length (D, G). The interface end of each electromagnet coil lies a small distance (K) from the core face.

6 Claims, 5 Drawing Sheets

DIFFERENTIAL TORQUE MOTOR

BACKGROUND OF THE INVENTION

One type of PM (permanent magnet) motor is a differential torque type. In that type of motor, torque may be obtained largely as a result of attraction of a PM for the soft magnetic core of the "next" electromagnet; current is applied to the "last" electromagnet to negate backward attraction of the PM for the core of the "last" electromagnet, to thereby release the PM. In common present motors, the current is limited primarily by back EMF, so for a constant moderate torque very high current is drawn at low speed, with the current falling to a moderate level only at a high speed. In applicant's differential torque motor, current for release is limited by coil characteristics in the presence of a high PM magnetic field, and a moderate current can create a moderate torque at both low and high speeds.

Applicant's differential-torque motor has become practical only with the relatively recent (since 1987) availability of high energy-product PMs. Applicant finds that the newer magnetic material, such as Nd-B-Fe (neodymium-boron-iron), has different characteristics than those presented in textbooks for previous PM material. A differential torque motor which took advantage of the characteristics of high energy product PMs to obtain higher starting torque and a large output in a motor of small volume, would be of considerable value. It is noted that a primary application of such motors is in electric powered vehicles, and that while the rotor containing the PMs generally lie within the stator, it is possible to have the rotor rotate around the stator or to use a "pancake" arrangement where the rotor and stator are of the same diameter.

SUMMARY OF THE INVENTION

In accordance with one embodiment of the invention, a PM (permanent magnet) motor is described which uses high energy-product PMs and electromagnet cores of soft magnetic material, which are configured to produce a high starting torque and to produce a large power output in a small volume. A preferred motor has phase units each consisting of three electromagnets and two PMs. At a start position of the preferred motor, a PM of each phase unit is centered between the soft magnetic cores of two electromagnets. The PMs and cores are configured so there is a slight overlap between each of the two core faces with the PM face. This takes advantage of the higher magnetic flux density near the edges of the PM face, to obtain a high starting torque as well as a large running torque.

Each core face has a smaller circumferential length than each PM face. As a result, the core magnetic field produced by current through the electromagnet coil, is large near the circumferential edges of the core face to produce a strong interaction with the magnetic field near the edge of the PM face, for increased torque.

Each PM face and core face has an axial length much larger than its circumferential length. The output torque increases almost linearly with axial lengths of the faces, for axial lengths that are up to about three or four times the circumferential length. This enables obtaining a large torque for a motor of given diameter and only moderate length, and which has a limited number of PMs and electromagnets.

The interface end of each electromagnet coil lies as close as practical to the core face. The distance between them is preferably no more than about one-third the circumferential length of the core. The close proximity of the coil end and core face, minimizes magnetic flux leakage from the opposite sides of the core instead of its face, which would tend to degrade motor performance.

A motor control which controls current flow to the electromagnet coils includes numerous control circuits, with a separate control circuit preferably being provided for each coil. The different control circuits have "grounds" which are isolated from each other. The current profile to each coil or set of coils, is digitally controlled by a transistor whose gate voltage is stepped. Stepping is performed by progressively connecting different profile resistors of a resistor ladder in series with a voltage source to produce a stepped gate voltage, with a microprocessor controlling switches that connect and disconnect the profile resistors. For release of PMs, the microprocessor allows current to flow in a first direction and in a timed step pattern through the coils. For increased torque, the microprocessor also allows current to flow in an opposite direction in a second timed step pattern through the coils, to pull the PMs toward the "next" electromagnet core.

The novel features of the invention are set forth with particularity in the appended claims. The invention will be best understood from the following description when read in conjunction with the accompanying drawings.

DESCRIPTION OF THE PREFERRED EMBODIMENT

Figure 2:
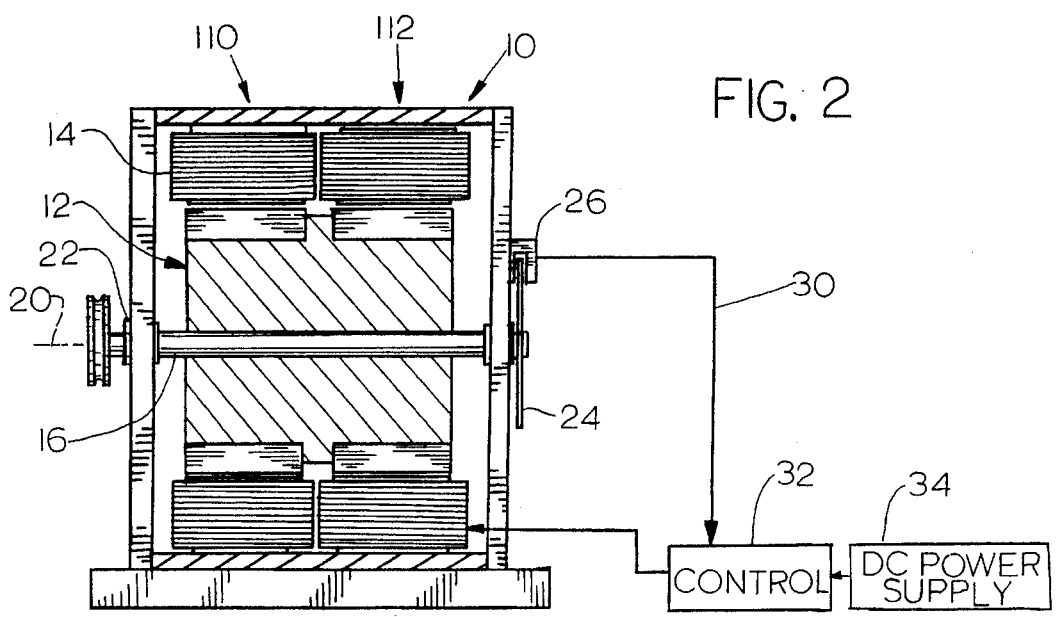
FIG. 2 is a sectional side view of the motor of FIG. 1.

FIG. 2 illustrates an electric motor 10 which includes a rotor member or rotor 12 and a stator member or stator 14. The rotor has a shaft 16 that is rotatable about an axis of rotation 20 on bearings 22. An index wheel 24 is fixed to the rotor shaft and rotates across an index sensor 26 which senses the rotational position of the rotor. The output of the index sensor is delivered over a sensor line 30 to a control circuit 32 which is connected to a DC power supply 34 such as a group of batteries. The control circuit controls the delivery of current from the power supply to the stator of the rotor, to energize the motor so as to rotate it.

Figure 1:
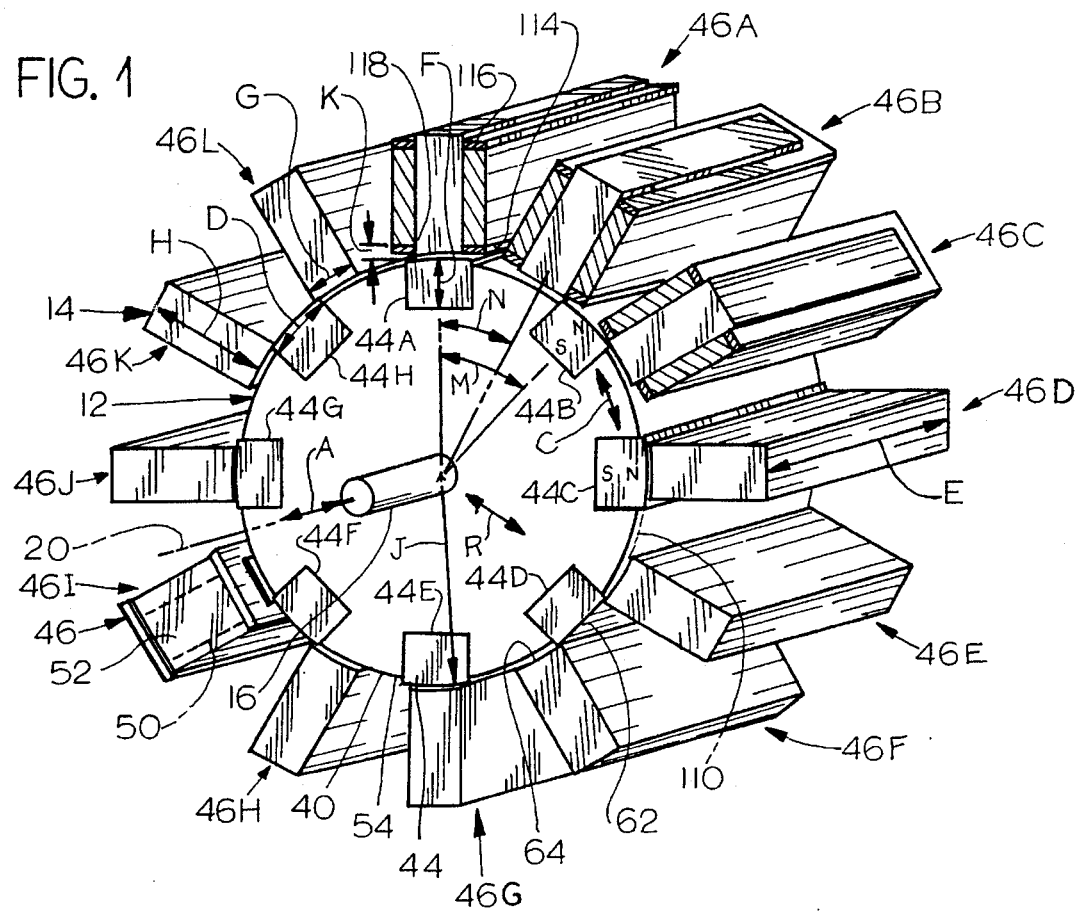
FIG. 1 is a simplified isometric view of a motor constructed in accordance with the present invention.

As shown in FIG. 1, the rotor 12 includes a rotor body 40 and a group of PMs (permanent magnets) 44 spaced about the periphery of the rotor and its body. The stator 14 includes a group of electromagnets 46 that each interact with the permanent magnets on the rotor. Each electromagnet includes a core 50 of soft magnetic material, that is, ferromagnetic material such as an iron-phosphorus alloy, and a coil or winding 52 that is electrically connected through a cable to the control circuit. The control circuit energizes the coils of selected electromagnets in a manner to cause rotation of the rotor.

The particular motor illustrated, has eight PMs 44A–44H which are uniformly spaced about the rotor axis 20 along the periphery 54 of the rotor. The PMs are spaced apart by an angle M of 45°. The motor has twelve electromagnets 46A–46L that are also uniformly spaced about the axis 20 so they are spaced apart by angle N of 30°. It is noted that in FIG. 1, the coils of only some of the electromagnets are shown, to avoid obstruction of the cores as seen in the figure.

Figure 3:
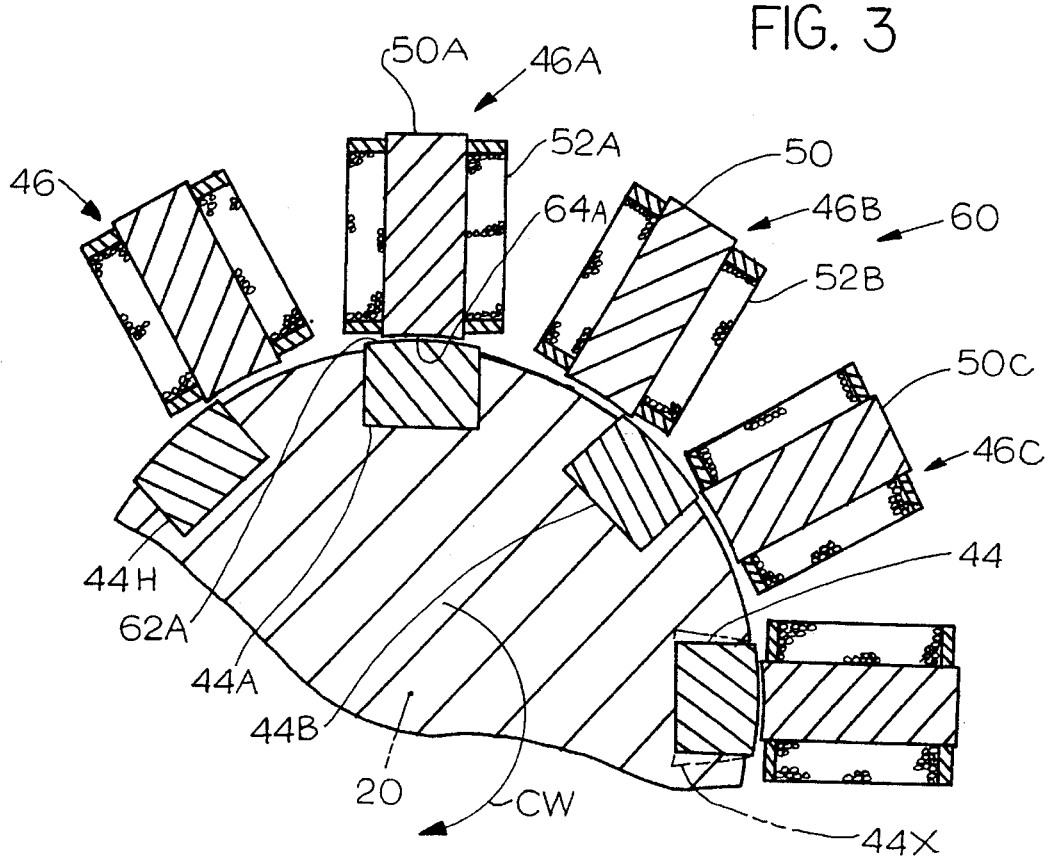
FIG. 3 is a partial sectional front view of the motor of FIG. 1.

As shown in FIG. 3, the PMs 44 and electromagnets 46 operate in phase units that each consists of two PMs and three electromagnets. The phase unit 60 includes the two PMs 44A, 44B, and three electromagnets 46A–46C. The rotor tends to stop at the position shown in FIG. 3, wherein the magnetic pole at face 62A of PM 44A is centered, or aligned, on the face 64A of the electromagnet core 50A. Also, the face of the second PM 44B lies halfway between a position of alignment with the faces of the other cores 50B, 50C of the phase unit.

It may be assumed that the rotor is to be started from the position of FIG. 3, to turn it in the clockwise direction CW. With relation to the PM 44B, the core 50B represents the "last" core that the PM 44B passed and is moving away from, while the core 50C represents the "next" core that the PM 44B is approaching. Applicant may initially apply current only to the coil 52B of the "last" electromagnet 46B, with the current being applied to counter the "backward" pull of the core 50B on the PM 44B. This allows the PM 44B to move toward alignment with the "next" core 50C as a result of magnetic attraction between the PM 44B and the soft magnetic core 50C. After the rotor has moved slightly clockwise from the position shown in FIG. 3, the first PM 44A will be moving away from alignment with its "last" core 50A. Then, the coil 52A of that electromagnet will be energized to release the PM 44A, and allow it to move toward alignment with the "next" core 50B.

The motor 10 has four phase units, with the electromagnets associated with each pair of permanent magnets constantly changing as the rotor turns. The application of current primarily to release a PM, appears to result in efficient use of the current. As a result, applicant sometimes prefers to apply current only in amounts to cancel the backward attraction of a PM for the core of the last electromagnet, with the amount of torque being regulated by "taking out" different numbers of phase units. That is, if a very low torque is required, current may be applied to only one of the four phase units (to the electromagnets thereof). As required torque increases, current is applied to additional phase units, until current is applied to the electromagnets of all phase units when a moderately high torque is required. If additional torque is required, this can be obtained by applying current in amounts exceeding that required to release a PM and in appropriate directions, so the current can pull and/or push the PMs to obtain high output torque. Initial tests indicate that applying current to the "next" electromagnet to pull the approaching PM, may not decrease efficiency, while applying extra current to the "last" electromagnet to push the PM may decrease efficiency and may be used only when high torque is needed.

Figure 8:
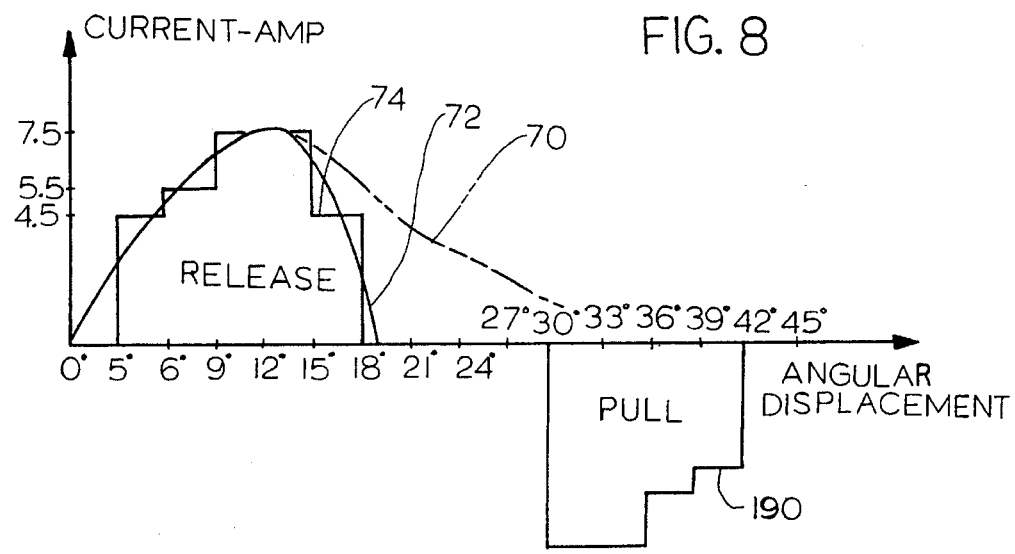
FIG. 8 is a graph showing variation in current with angular position of the rotor of the motor of FIG. 3.

FIG. 8 includes a graph 70 representing the variation in current supplied to an electromagnet, with displacement of the PM from a position of alignment therewith (at 0°), to achieve substantially zero force between them as the PM rotates on a rotor. However, in a real motor as one PM moves away from an electromagnet, another permanent magnet moves closer thereto, and the current has to be stopped earlier. Graph 72 represents a better variation of current with angular position of the rotor (where 0° is where a PM is aligned with the electromagnet to be soon energized, as in FIG. 3 where PM 44A is aligned with core 50A). It can be seen that the current falls rapidly at an angular rotation of more than about 18°, in order to avoid repulsion of the PM that is approaching the electromagnet. The graph 74 represents a digital approximation of the curve 72, with the digital approximation being useful to enable better control with lower cost digital circuitry.

Figure 4:
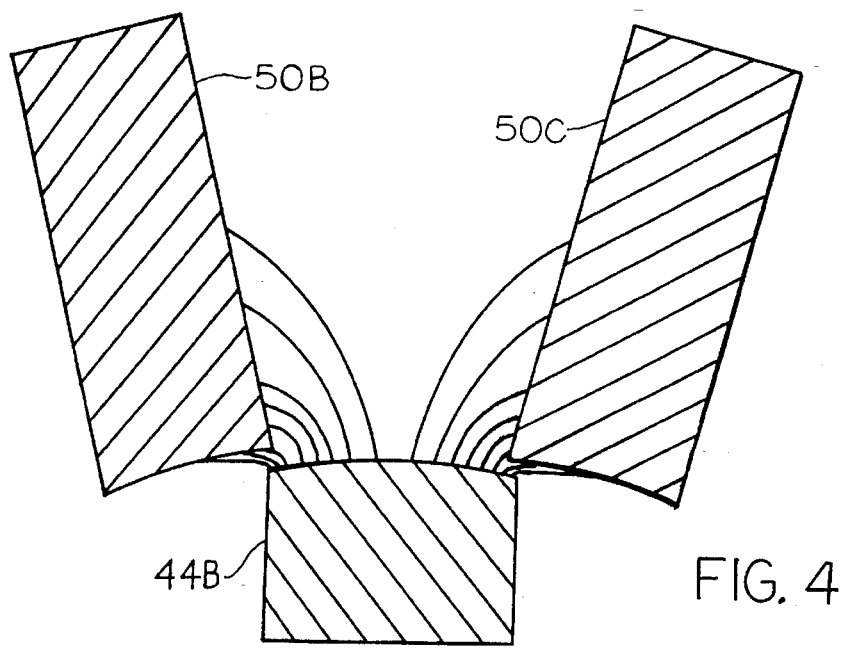
FIG. 4 is a simplified view of a permanent magnet and two electromagnet cores of the motor of FIG. 8, which includes a qualitative schematic diagram of magnetic flux lines therebetween.
Figure 5:
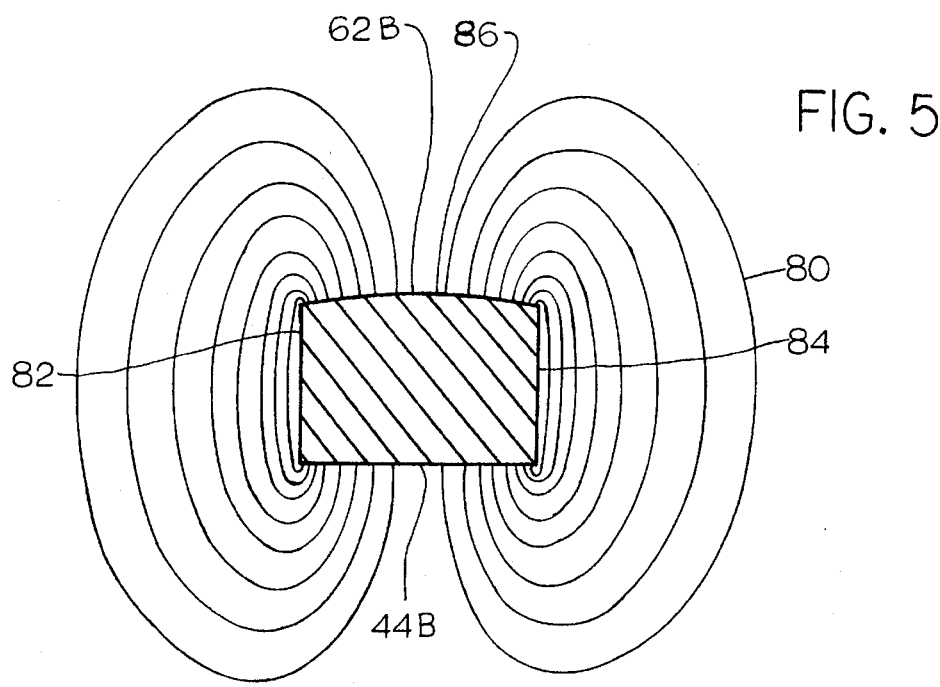
FIG. 5 is a sectional view of just the permanent magnet of FIG. 4, showing qualitatively, the magnetic flux lines in the absence of a nearby core.

FIG. 5 illustrates the PM 44B showing magnetic flux lines 80, with the density or closeness of the flux line indicating the flux density of the magnetic field. These flux lines can be obtained by viewing the pattern of iron filings or tracing the magnetic field, and represents a gross approximation of measured flux lines. One characteristic that becomes apparent is that the flux density or magnetic field strength along the face 62B of the magnet is greater near the edges 82, 84 than at the middle 86 which lies halfway between the edges. In PMs of Alnico 5 (aluminum, nickel and Cobalt) which was the best type of PM available prior to about 1987, the maximum stored energy, BH max, was about 43 kjm$^{-3}$ (kilojoules per cubic meter), and the coercivity $H_c$ was about 2 kOe (kiloersteds). The magnetic flux energy of this type of PM (as well as PMs of other material), was considered to be substantially uniform along the face of a magnet. With presently available PMs of material such as Nd-B-Fe, which has a maximum stored energy of about 260 kjm$^{-3}$ and a coercivity of about 9 kOe, applicant finds that the flux density varies, with the magnetic field strength being at least 5% or 20% greater, and found to be about 100% greater, near the edge of the face than near the middle. One plausible explanation for this variation is the internal crystalline structure of Nd-B-Fe, although it could be due to the high energy stored (BH) or the high coercivity. FIG. 4 shows how the flux lines would appear to lie, based on iron filing traces, in the presence of electromagnet cores 50B, 50C. Thus, each of the PMs has a magnetic flux density which is at least 10% greater at a location adjacent to a corresponding PM edge than at the PM face middle.

Figure 6:
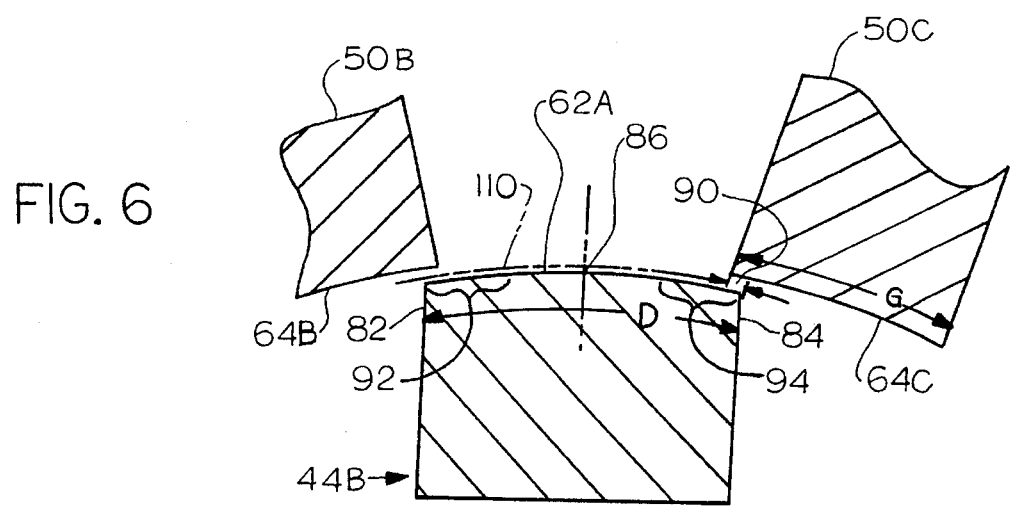
FIG. 6 is a view similar to that of FIG. 4, but without showing the magnetic flux lines.

Applicant takes advantage of the variation in flux density across the face of the PM, by constructing the motor so there is initial overlap between a centered PM such as 44B in FIG. 6 and the cores 50B, 50C of the adjacent electromagnets. The distance 90 of overlap is closely controlled to obtain maximum starting torque for the motor. The face 62A of the PM 44B has face edge portions 92, 94 where locations on the face lie closer to a corresponding edge 82, 84 of the magnet than to the middle 86 of the face. By constructing the motor so there is overlap at the starting position, applicant takes advantage of the edge effect (that the field strength is greater near the edges than near the middle of the PM face) to obtain maximum starting torque. Applicant finds, in experiments with a motor of the illustrated construction, that maximum starting torque is obtained with a small but definite overlap. The desired amount of overlap also increases torque when the motor is running, and increases efficiency.

Figure 7:
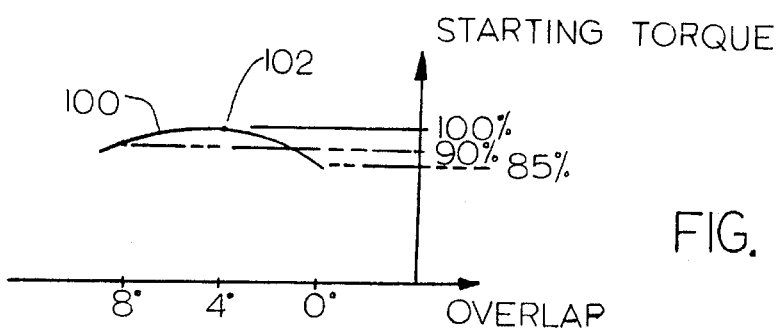
FIG. 7 is a graph showing variation in starting torque with PM-to-core overlap, for the motor of FIG. 1.

As indicated in FIG. 6, the face 62A of the PM has a circumferential length D. The amount of overlap 90 by which each core overlaps a PM face, can be expressed as a per cent of the length D. FIG. 7 contains a graph 100 that shows variation in starting torque with overlap. The graph 100 shows that starting torque is maximum at the location 102 where the overlap is about 4% of the circumferential length D of the PM face. If the overlap is decreased to zero or increased to about 8%, the starting torque falls respectively to about 85% and 90% of maximum. The overlap is preferably at least 1% but no more than 8% of the circumferential length of the PM face. Applicant prefers to use an amount of overlap which is slightly less than that at location 102, to produce an increasing torque as the rotor begins to turn. It should be realized that starting torque is of very great importance for a motor used to drive a vehicle, as the greatest torque is required at initial start to overcome static friction.

A predetermined overlap at startup is obtained by adjusting the relative circumferential lengths D (FIG. 1) and G of the PMs and electromagnet cores, for a rotor of predetermined radius J. It may be noted that the faces 62, 64 of the PMs and cores are slightly spaced apart, with an imaginary interface circle 110 lying between them. It would be possible to make the circumferential lengths D and G of the magnets and cores equal. However, applicant obtains somewhat greater torque for a motor of given volume, by increasing the circumferential lengths D of the PMs and decreasing the lengths G of the cores. The decreased width G of the cores results in less soft magnetic material to be demagnetized by the electromagnet coil, while the increased width of the PM results in greater magnetic attraction for the next core. The circumferential PM length D of each PM face is preferably at least 10% greater than the circumferential core length G of the core face, and more preferably about 40% (i.e. between 20% and 60%) greater.

Applicant prefers to construct the PMs 44 and cores 50 so they have substantially the same axial length E. It would be possible to construct each PM or core with a substantially square face. However, applicant finds advantage in constructing the PMs and cores so their axial length E is much greater than their circumferential length D or G. Tests by applicant reveal that the torque produced by the rotor increases substantially linearly with axial length E of the PMs and cores, for axial lengths E of up to about 300 or 400% of the circumferential length of the PM or core. The voltage and therefore power, required to release a PM also increases roughly linearly, so the main advantage is not an increased efficiency of mechanical power output to electrical power input. Instead, the advantage of a long axial length E is that for a motor of given rotor or motor outside diameter, applicant can increase the torque and power by a moderate increase in the axial length of the motor.

Instead of using eight PMs having axial lengths E about three times their circumferential lengths D, applicant could obtain about the same output using three rotor sections, each with eight PMs, with twelve electromagnets at each rotor section, for a total of twenty-four PMs and thirty-six electromagnets. The need to provide and mount three times as many PMs and electromagnets (each with a separate coil) results in a much greater cost than providing axially elongated PMs and electromagnets. Applicant has found that when the axial length of the PMs and cores exceeds about four times the circumferential length G of the cores, that the magnetic release by the coil becomes uneven and efficiency drops. The axial length E of the faces of the PMs of the and cores is preferably more than 10% greater than their circumferential length, more preferably over 50% greater, even more preferably over 100% greater, and most preferably about 200% greater (three times as great) than the circumferential length D of the PMs and 300% greater than the circumferential length G of the cores. The axial length of the PM face should not exceed six times (should not be over 500% greater than) its circumferential length.

The above-described motor produces a "cogging" effect in that there is a rapid rise and fall of torque during every 7½° of rotation. The cogging effect is most evident when a minimum number of phases are being energized and the motor is turning at low speed. The cogging effect can be reduced by using two or more rotor sections 110, 112 (FIG. 2) which are identical, but which are offset by 22.5° from each other. Further reduction in cogging can be obtained by using two additional rotor sections with all four sections offset by 11¼° from each other. Cogging can be reduced by using current to pull a "next" PM.

Applicant has constructed and successfully tested a motor of the type illustrated. As shown in FIG. 1, each PM face had a circumferential PM length D in the circumferential direction C of 0.7 inches, an axial length E in the axial direction A of 2.0 inches, and a radial length F in the radial direction R of 0.5 inch. Each electromagnet core face had a circumferential core length G of 0.5 inch, an axial length E of 2.0 inches, and a radial length H of 1.25 inch. The rotor had an outside radius J at the PM faces, of 2.2 inches. The rotor radius, PM circumferential lengths D and core circumferential lengths G are chosen to obtain the desired per cent overlap described above. It may be noted that applicant prefers to slightly taper the PMs, as indicated at 44x in FIG. 3, to hold them in place.

Each of the electromagnets includes a winding or coil 52 of 300 turns of wire. The coil must be very securely held in relation to the core, or else the coil tends to move radially inwardly to the PMs. Of course, this requires rigid coil end plates 114, 116 at radially opposite ends of the coil. The end plates result in the radially inner ends of the coil being spaced from the core face 64. Applicant has found that this spacing must be kept to a minimum to avoid degrading motor performance. If the distance K between the coil inner end 118 and the core face is more than about one third the circumferential length G of the core face, significant magnetic flux leaks out of the opposite sides or edges of the core, instead of being concentrated at the core face, which results in less than complete release of a PM for a given current that would completely release a PM if the coil extended up to the core face. These effects are minimal when the coil end lies about one third G from the core face, but become significant if the coil end lies further than that away from the core face. Applicant uses thin aluminum face plates to minimize the deleterious effects.

Figure 9:
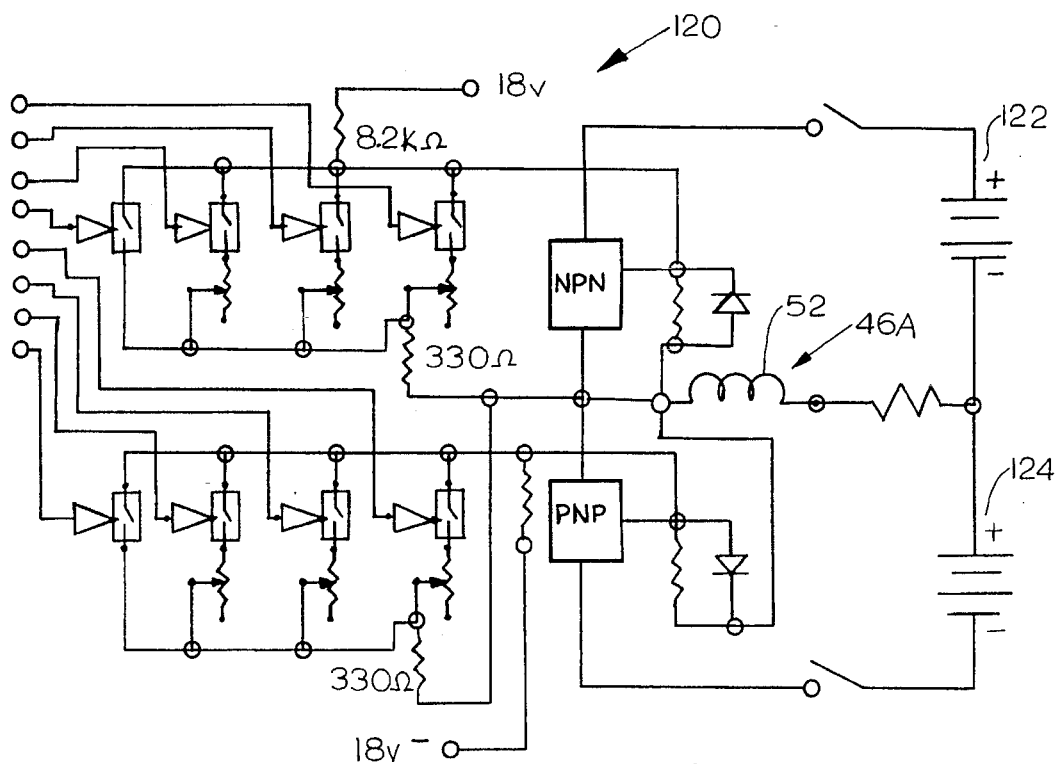
FIG. 9 is a schematic diagram of a circuit of the control of the motor of FIG. 2.

FIG. 9 illustrates a single coil controller circuit 120 of control 32, which controls current flow from a pair of batteries 122, 124 to a single one of the coils 52 of an electromagnet 46A of the motor of FIG. 1. Twelve circuits identical to circuit 120A are used to control all of the coils of the motor of FIG. 1.

Figure 10:
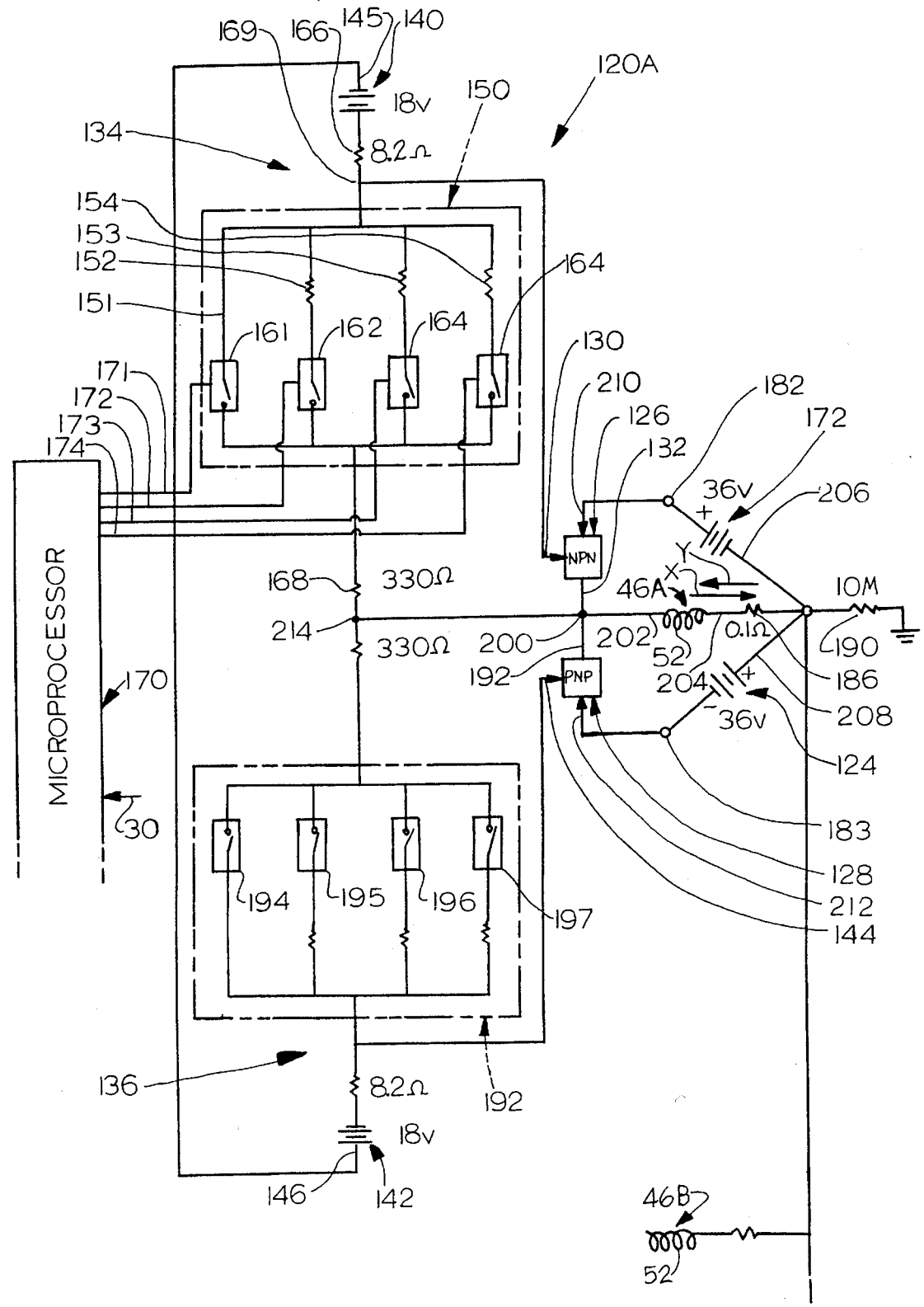
FIG. 10 is another diagram of the circuit of FIG. 9.

FIG. 10 is another schematic diagram of the control circuit of FIG. 9, wherein the components are arranged to aid in understanding the circuit. It is assumed that the motor is energized for forward rotation (CW in FIG. 3). A major portion of current is used to "release" the PMs, that is, to counter the "backward" pull of a PM for the "last" electromagnet core. Such release current flows from a current source formed by 36 volt forward battery 122, through NPN MOSFET type transistor 126 (forward transistor), and in direction X through the coil 52 of electromagnet 46A back to the forward battery 122. It would be possible to increase torque by applying a forward current much higher than that required for release, to thereby "push" away a PM. However, applicant's tests show that such excess current for "pushing" results in inefficiency, and would be used (it at all) only where very high torque is required regardless of efficiency. In any case applicant prefers that less than 20% of energy (voltage-current integral with time) consumed by the motor and preferably less than 10% of energy be used for push even for moderately high output (75% of maximum torque that can be safely produced by the rotor). Also, applicant prefers that less than 20%, and more preferably less than 10%, of the voltage-current time integral of current that flows in the forward direction through any coil, be in excess of that required to just release the closest PM that is moving away from the core of that electromagnet. Instead of trying to "push", applicant obtains increased torque (over that obtained for release), by applying a reverse current through each coil to "pull" a PM (e.g. 44B in FIG. 3) toward the "next" electromagnet core (50C). A reverse current for "pull" flows from 36 volt reverse battery 124 (FIG. 10), in the opposite direction Y through the coil 52, and through PNP transistor 128 (reverse transistor) back to reverse or pulling battery 124. The following description is for forward rotation using forward battery 122.

The current profile is as shown at 72 in FIG. 8, with the profile for a given electromagnet repeating after each 45° of rotation. As shown in FIG. 8, the current level increases from zero in three steps, then decreases in two steps back to zero. In the circuit of FIG. 10, the voltage on the gate 130 (relative to the voltage on the source 132) of forward transistor 126, determines the current at any instant. Applicant uses two resistor ladders 134, 136 in series with a voltage supply formed by two 18 volt gate-control batteries 140, 142, as a profile subcircuit that controls the voltage at the gates 130, 144 of transistors 126, 128. The batteries have opposite polarity voltage contacts 145, 146 connected together. The resistor ladder 134 includes a group 150 of four profile resistors 151–154 (resistor 151 has zero resistance) and corresponding computer-controlled switches 161–164. The group 150 is connected in series with the other ladder resistors 166, 168. The particular one of the switches 161–164 which is closed at any instant determines the voltage applied to the transistor gate 130 at that instant. A location 169 along the resistor ladder is connected to the gate 130. When zero current is to flow through the electromagnet, first switch 161 is closed to maintain a gate voltage (e.g. +2 volt) that keeps the transistor, or MOSFET 126 below threshold and thus off (MOSFET 126 first opens or conducts current at a gate voltage of +3.5 v, and this circuit is fully on at a gate voltage of about 9 v). It is noted that resistors 152–154 can be variable resistors for use during development.

The four switches 161–164 are opened or closed by the output of a computer, or microprocessor 170. The microprocessor produces a binary output (a voltage that is high or low) on each of four lines 171–174 connected to the four switches, to set the resistance of the lower half of resistance ladder 134. The microprocessor therefore determines the MOSFET gate voltage, to thereby control the current through one electromagnet 52. When the motor rotates at a moderate speed such as 500 rpm, each 3° increment (as shown in FIG. 8) may last for one millisecond, so fast computer control is highly desirable. The computer has an input 30 indicating the rotational position of the rotor.

The other eleven control circuits are similar to circuit 120A, and each of the circuits is connected at three points 181–183 to the circuit of FIG. 10. A small resistor 186 lies in series with each coil and/or each battery, and is used to sense current flow (by measuring voltage across it). In a usual design approach, the source 132 of MOSFET 126 would be at ground potential. However, in this case, where several electromagnets may receive current at the same time, such an arrangement would prevent independent electromagnet control. Applicant does not use a ground which is at earth potential, except that a large resistor 190 connects to earth to avoid a static charge buildup when the motor is off.

It is noted that a largely similar current profile is used in both release and pull. FIG. 8 includes graph 190 that shows the variation in current with rotor angular position, to efficiently obtain almost twice the torque that would be obtained solely by release represented by graph 74. The direction of current through the electromagnet coil is the reverse of that for release. The same computer output is delivered to the switches of the reverse profile resistor group 192 of the reverse resistance ladder 136 of the reverse portion of the circuit for pull operation of the motor. For pull operation, the same microprocessor outputs 171–174 can be applied to the switches 194–197 of the reverse profile resistor group.

The MOSFET sources 132, 192 of the forward and rearward transistors 126, 128 are connected together at a common junction 200, where one end 202 of the electromagnet coil is connected. The other coil end 204 of the coil is connected to voltage terminals 206, 208 of the batteries, with the terminal 206 of battery 122 being positive with respect to its other terminal at 182, and with the terminal 208 of the other battery 124 being negative with respect to its other terminal at 183. The other battery terminals are connected to the MOSFET drains 210, 212. Thus, the common junction 200 is nominally at ground potential. The two gate-control batteries 140, 142 serve as a current supply with a substantially balanced voltage, which results in the location 214 where the two resistor ladders are connected together being nominally at ground potential. Applicant connects the location 214 to the common junction 200, which results in the voltage at each transistor source being closely related to the voltage at its gate.

In a motor control that applicant has designed, the resistances 152–154 were set at about 4.6 k ohms, 6.0 k ohms, and 7.3 k ohms to produce gate voltages of about 6.8 volts, 7.8 volts and 8.7 volts, respectively, to produce the three current levels shown in FIG. 8. The switches 161–164 were DG201 logic switches which are available with four switches per package. The transistors are MOSFET types. A similar manner of operation is used for rotation of the rotor in the reverse direction, with the timing of the currents being the reverse of the graphs of FIG. 8, but with the directions of current flow being the same for release and for pull as shown in FIG. 8.

Thus, the invention provides a PM release motor which uses the characteristics of high energy-product PMs to enhance motor operation. The circumferential lengths of the PMs and electromagnetic cores are selected so at a start position, wherein a PM is centered between the cores of two electromagnets, there is a slight but definite overlap between the edge parts of the PM face and of the core face, to increase starting torque, the overlap preferably being between one and eight per cent of the circumferential length of the PM. The circumferential length of each PM is about 30% greater than the circumferential length of each core face, to reduce current for demagnetizing the core while increasing the PM magnetic field. Each PM face and core face has a much longer axial length than its circumferential length, to obtain a large torque output from a motor of given diameter, while minimizing the number of PMs and electromagnets. The radially inner end of each electromagnetic coil lies close to the face of the electromagnetic core, to minimize magnetic flux lines emanating from the opposite side edges of the core. A separate control circuit is provided for every electromagnet coil (or perhaps for every two of them), with coil current controlled by the binary output of a computer which switches different resistors into a resistor ladder of a gate-control subcircuit. The control circuit can apply current in one direction for release and an opposite direction for pull, but does not apply substantial extra release current to push.

Although particular embodiments of the invention have been described and illustrated herein, it is recognized that modifications and variations may readily occur to those skilled in the art, and consequently, it is intended that the claims be interpreted to cover such modifications and equivalents.

I claim:

1. An electric motor that includes a rotor member that is rotatable about an axis and a stator member, with a first of said members having a plurality of PMs spaced about the axis of rotor rotation, with each PM having a PM face that has a circumferential length with respect to said axis, that has a magnetic pole and that lies adjacent to and on a first side of an imaginary interface circle, and with said PM faces spaced in a circumferential direction from one another substantially about said circle, with a second of said members having a plurality of spaced electromagnets each having a core of soft magnetic material and a coil wound about the core, with each core having a face lying adjacent to said interface circle on a second side thereof, and a control coupled to said electromagnets to energize each of a plurality of said electromagnets wherein each of said PM faces has a circumferential length and has circumferentially spaced opposite PM edges and has a PM face middle lying halfway between said edges, and each PM face has PM face edge portions that each lies closer to a corresponding one of said edges than to said middle, and wherein each of said core faces has circumferentially spaced opposite core edges and a core face middle and has core face edge portions each lying closer to a core edge than to the core face middle, and wherein at least a section of said rotor is magnetically biased toward a predetermined start position, characterized by:

each of said PMs has a magnetic flux density which is at least 10% greater at a location adjacent to a corresponding PM edge than at the PM face middle;

said PM faces and core faces are positioned so at said start position, a first of said PMs is located with each of its opposite edge portions lying directly opposite a face edge portion of a corresponding one of said cores, to create an overlap between a location adjacent to each corresponding PM edge of said first PM and one of said core face edge portions of a corresponding one of said cores, with each of said overlaps extending circumferentially by a distance which is at least 1% but no more than 8% of the circumferential length of the PM face of said first of said PMs.

2. The motor described in claim 1 wherein:

the length of each of said PM faces in a direction parallel to said axis, is at least twice as great, but not more than six times as great, as the circumferential length of the face.

3. An electric motor that includes rotor and stator members that lie adjacent to each other at an imaginary circular interface that is centered on an axis of rotation of the rotor member, with a first of said members having a plurality of PMs, with each PM having a PM face at said interface and with each PM face having a pair of PM edges that are spaced along said interface, and with said PM faces of said PMs being spaced about said circular interface, and with a second of said members including a plurality of electromagnets having coils and having cores with core faces spaced about said circular interface, and a control coupled to said electromagnets to energize them, characterized by:

each of said PMs has a magnetic flux density which is at least 10% greater at a location adjacent to a corresponding PM edge than at a middle of the PM face, as viewed along said axis of said rotor member;

said PM faces and said core faces are positioned so at a predetermined rotor position, a first of said PMs is located with each of its opposite edge portions lying directly opposite a face edge portion of a corresponding one of said cores to overlap the core face, to form an overlap at each of said opposite edge portions of said first PM, with said first of said PMs having a predetermined circumferential length and with each of said overlaps being between one and eight percent of the circumferential length of the PM face.

4. The electric motor described in claim 3 wherein:

each of said PM faces has an axial length (E) which is over 50% but less than 500% greater than the circumferential length of the PM face.

5. An electric motor that includes rotor and stator members that lie adjacent to each other at an imaginary circular interface that is centered on an axis of rotation of the rotor member, with a first of said members having a plurality of PMs with PM faces spaced about said circular interface, and with a second of said members including a plurality of electromagnets having coils and having cores with core faces spaced about said circular interface, and a control coupled to said electromagnets to energize them, wherein each of said PM faces has a predetermined circumferential PM length and each of said core faces has a predetermined circumferential core length, characterized by:

said PM faces and core faces each have an axial length which is between 50% and 500% greater than said circumferential PM length.

6. The electric motor described in claim 5 wherein:

said PM faces each have an axial length which is at least 100% greater but not more than 300% greater than said circumferential PM length.

* * * * *